United States Patent [19]
Diamond et al.

[11] Patent Number: 5,948,341
[45] Date of Patent: Sep. 7, 1999

[54] APPARATUS, SYSTEM AND METHOD FOR REMOVING PARTS FROM A MOLD

[75] Inventors: Andrea Lucille Diamond, Kettleby; Paul Fedor Kresak, Newmarket, both of Canada

[73] Assignee: Husky Injection Molding Systems Ltd., Canada

[21] Appl. No.: 08/982,437

[22] Filed: Dec. 2, 1997

[51] Int. Cl.$^6$ .......................... B29C 37/00; B29C 39/36; B29C 45/42; B29C 45/43

[52] U.S. Cl. .......................... 264/335; 164/269; 406/195; 414/676; 425/437; 425/556

[58] Field of Search .............. 264/335; 425/556, 425/436 R, 437, 436 RM; 406/194, 195; 414/793, 627, 676; 164/131, 269, 403

[56] References Cited

U.S. PATENT DOCUMENTS

| | | |
|---|---|---|
| 1,964,167 | 6/1934 | Needham . |
| 4,215,956 | 8/1980 | Reba ........................................ 406/194 |
| 4,957,581 | 9/1990 | Jahrig et al. . |
| 5,198,028 | 3/1993 | Nakano et al. ........................... 414/676 |
| 5,234,328 | 8/1993 | Willson et al. ........................... 425/139 |
| 5,326,517 | 7/1994 | Yaita et al. ............................... 264/335 |
| 5,364,583 | 11/1994 | Hayashi ................................... 264/335 |
| 5,629,031 | 5/1997 | Ishikawa et al. ......................... 425/139 |

FOREIGN PATENT DOCUMENTS

| | | |
|---|---|---|
| 2129995 | 11/1972 | France . |
| 2691097 | 11/1993 | France . |
| 0679493 | 11/1995 | Germany . |
| 8-169020 | 7/1996 | Japan . |
| 8-197591 | 8/1996 | Japan . |
| 9-150440 | 6/1997 | Japan . |
| 2169192 | 7/1986 | United Kingdom . |

*Primary Examiner*—Jill L. Heitbrink
*Attorney, Agent, or Firm*—Fitzpatrick, Cella, Harper & Scinto

[57] ABSTRACT

Lightweight part retention apparatus is arranged on a removal tool plate. A low pressure air supply is supplied to the apparatus to induce an area of reduced pressure in a channel formed in a passage therein, the reduced pressure being formed by a jet pump action within the channel. The reduced pressure draws a part to be removed from a mold or the like into the apparatus and retains it therein until a separate device removes it and/or the air supply is interrupted. Due to the relatively low mass of the retention apparatus, the tool plate and retention apparatus, with the molded part retained therein, can then be rapidly withdrawn from the open mold to permit early closing of the mold so that a new molding cycle may begin.

18 Claims, 4 Drawing Sheets

APPARATUS, SYSTEM AND METHOD FOR REMOVING PARTS FROM A MOLD

FIELD OF THE INVENTION

The present invention relates to a system, method and apparatus for removing parts from a mold. More particularly, the present invention relates to a system, method and apparatus for removing parts from a single or multi-cavity mold in a molding machine such as an injection molding machine, thermoforming machine, directing machine, molding press or the like.

DESCRIPTION OF THE PRIOR ART

Molding machines, such as injection molding machines and the like, for molding parts from plastic or other materials are frequently operated in connection with a handling device, robot, manipulator, or the like to reduce costs, improve cycle times, etc. In particular, a high degree of automation has been achieved in injection molding operations, especially in terms of the ejection of molded parts from the mold.

However, the problem of handling parts immediately following their ejection from the mold has not achieved the same degree of efficiency, particularly when molding machines are used to make a wide range of sizes and shapes of molded products in a multi-cavity arrangement.

For example, removal of parts from an injection molding machine usually proceeds as follows: first, the mold is opened by moving the mold halves apart. Next, a removal tool enters the mold area A mold ejector then performs an eject stroke so that each molded part is partially moved off of its respective mold core by means of ejector pins or the like and brought out into a removal region. As is known by those of skill in the art, when the mold is opened and the molded pat cool, the parts usually shrink onto the mold cores and thus the eject stroke is required to at least initially free the parts from the cores.

When the eject stroke is complete, the parts are in the removal region where they are engaged by the removal tool by various techniques, including mechanical grippers and applied vacuums. The removal tool then moves away from the cores, parallel to the direction of the ejector stroke, to completely remove the parts from the cores. In some cases, this movement of the removal tool away from the mold cores is commenced before the ejector has reached the end point of its ejection stroke. After completing its movement to clear the parts from the cores, the removal tool then moves in a direction transverse to the direction of ejection, i.e. out of the mold, completely removing the molded parts from the molding area for further treatment or transport and allowing the mold to be closed for another injection cycle.

As will be apparent, the various movement operations of the mold, the ejector and the removal tool must be carefully coordinated with one another and, ideally, carried out with some time overlap so as to achieve a faster cycle rate of the machine to improve productivity. Inadvertent collisions and damage must also be avoided, and complete removal of all parts from the mold in a multi-cavity arrangement must be reliably ensured.

The prior art is replete with various methods and devices, including robot systems, for entering an open mold to remove molded parts in synchronism with a continuous molding cycle. Many of the prior art removal tools, especially the robot-based systems, are relatively massive. Thus, they are difficult to accelerate and decelerate as the tools reciprocate into and out of the mold. The time required for the removal tool to enter and exit from the mold area directly affects cycle time since the molding cycle cannot continue until the removal tool clears the area. Therefore, faster part removal tools offer significant advantages relative to increased productivity and yet with massive removal tools it is often difficult to operate the units at high speeds in synchronism with molding operations.

Specifically, it is necessary to maintain accurate registration between the removal tool and the cores of the mold so that when the removal of molded products from the mold to the removal tool occurs, each individual molded part is removed without distortion and each core is emptied. An undesirable consequence of accelerating the removal tool very quickly is that it can create or accentuate vibration therein, resulting in inaccurate positioning of the tool plate relative to the mold The acceleration and deceleration of the removal toot plate requires the input or removal of kinetic energy in terms of a force acting on the components that need to be moved. The greater the mass that must be moved, the greater the forces, and therefore, the energy change that is involved. The reaction of these forces acts to deform the bodies, resulting in vibration. Therefore, vibration of massive removal tool units is common, and frequently results in failure to retrieve every molded part or in distortion or mutilation of at least some of the molded parts.

Removal tools which employ mechanical grippers as part retainers to remove the parts are well known in the art, and have most recently been disclosed in U.S. Pat. No. 5,629,031, whereby molded parts are physically "chucked" together in a pneumatically driven grasping member. The use of vacuum cups as part retainers is also well known. One difficulty with these approaches is that they require a significant amount of time to be activated, either to move parts between open and closed positions or to apply and remove the required vacuum, resulting in slower machine cycle times and lower machine productivity.

In an attempt to avoid the poor response achieved with moving the parts of mechanical grippers molded parts can also be engaged by the part retainers employing suction developed by a high volume vacuum pump or other vacuum generator. U.S. Pat. No. 5,234,328 to Willson et al. discloses an example of such a system for rapidly removing parts from an injection mold. However, high volume vacuum pumps or generators tend to be very bulky and heavy, and cannot be placed adjacent the part retainers of the removal tool due to the excessive vibration problems which can be caused by their mass, as discussed earlier. Instead, such pumps are placed at a remote location on the structure of the molding machine, or robot base, and are connected to the moveable part of the removal tool by large diameter flexible hoses or telescoping tubes. These hoses or tubes do not endure the extremely high accelerations of high speed robots over long periods of time, and can suffer leaks and other failures. Furthermore, the long lengths of piping between the vacuum pump and the part retainers delay the application of vacuum to the part to be removed, leading to longer machine cycle times and decreased productivity.

It is desired to have a system, apparatus and method of removing parts from molds which is reliable, ensuring removal of all parts from the mold, and which allows relatively fast cycle times to be obtained.

SUMMARY OF THE INVENTION

It is an object of the present invention to provide a novel apparatus, system and method for removing parts from a mold which obviates or mitigates at least one of the disadvantages of the prior art.

According to a first aspect of the present invention, there is provided a part retention apparatus comprising:

a body including at least one passage extending through said body and said passage including an inner surface, at least a portion of which is complementary in shape to a part to be retained; and at least one channel formed in the inner surface of said passage, said channel comprising a converging port extending from a first end of said at least one passage at which said part is received and a diverging port connected to said converging port and extending to a second end of said passage opposite said first end and said at least one channel fare comprising at least one nozzle operable to inject air supplied thereto into said diverging port wherein, upon entry of a part into said at least one passage, an area of reduced pressure is formed in said channel about the connection between said converging port and said diverging port by said injected air and said area of reduced pressure acts to draw said part into said passage and to retain said part therein.

According to another aspect of the present invention, there is provided a part removal system for a molding machine comprising:

a removal tool plate;

at least one part retention apparatus mounted to said removal tool plate and comprising a body including at least one passage extending through said body and said passage including an inner surface, at least a portion of which is complementary in shape to a part to be retained and at least one channel formed in the inner surface of said passage, said channel comprising a converging port extending from a first end of said at least one passage at which said part is received and a diverging port connected to said converging port and extending to a second end of said passage opposite said first end and said at least one channel further comprising at least one nozzle operable to inject air supplied thereto into said diverging port wherein, upon entry of a part into said at least one passage, an area of reduced pressure is formed in said channel about the connection between said converging port and said diverging port by said injected air and said area of reduced pressure acts to draw said part into said passage and to retain said part therein;

means to move said removal tool plate into and out of an open mold;

means to supply said pressurized air to said at least one part retention apparatus to draw in and maintain a part therein; and means to remove a part from said retention apparatus when said removal tool plate is out of said mold.

According to yet another aspect of the present invention, there is provided a method of removing a part from a mold comprising the steps of:

(i) opening a mold containing at least one part to be removed, said part being on a mold core;

(ii) moving a removal tool plate with at least one part retention apparatus mounted thereon into said mold such that said part retention apparatus is adjacent to and aligned with a respective said mold core;

(iii) ejecting said part from said mold core such that at least a portion of said part enters said part retention apparatus;

(iv) supplying pressurized air to said at least one part retention apparatus to induce at least one area of reduced pressure between said part and said apparatus, said area drawing said part into said apparatus and retaining said part therein;

(v) moving said removal tool plate out of said mold to a part unloading position and closing said mold;

(vi) removing said at least one part from said apparatus; and (vii) repeating steps (i) through (vi) for each injection operation.

The present invention provides a lightweight part retention apparatus including a passage to receive and retain a part. One such apparatus can be employed for each individual molded part to be removed from a mold, the apparatus arranged on a removal tool plate in an array that corresponds to the array of mold cores. It is further contemplated that a part retention apparatus can include two or more passages to receive and retain a corresponding number of parts. A moderately low pressure air supply of less than about 200 psi is supplied to each part retention apparatus, preferably by a direct individual connection, or from a suitable manifold located on the tool plate or an arm and connected to an air supply. The air is injected into at least one channel in the passage or passages of the retaining apparatus, each channel comprising a pair of connected converging and diverging ports with the air being injected by a nozzle into the diverging port, adjacent the connection to the converging port. The injected air acts within the channel as a jet pump and creates a region of reduced pressure relative to the surroundings. The resulting pressure differential forms rapidly and locally and draws a molded part from the mold as it is ejected into the apparats. The removal tool plate and the retention apparatus, with the molded parts just removed, can then be rapidly withdrawn from the open mold to permit relatively rapid cycle times to be achieved.

BRIEF DESCRIPTION OF THE DRAWINGS

Preferred embodiments of the invention will now be described, by way of example only, with reference to the attached figures, wherein.

DETAILED DESCRIPTION OF THE INVENTION

Figure 1:
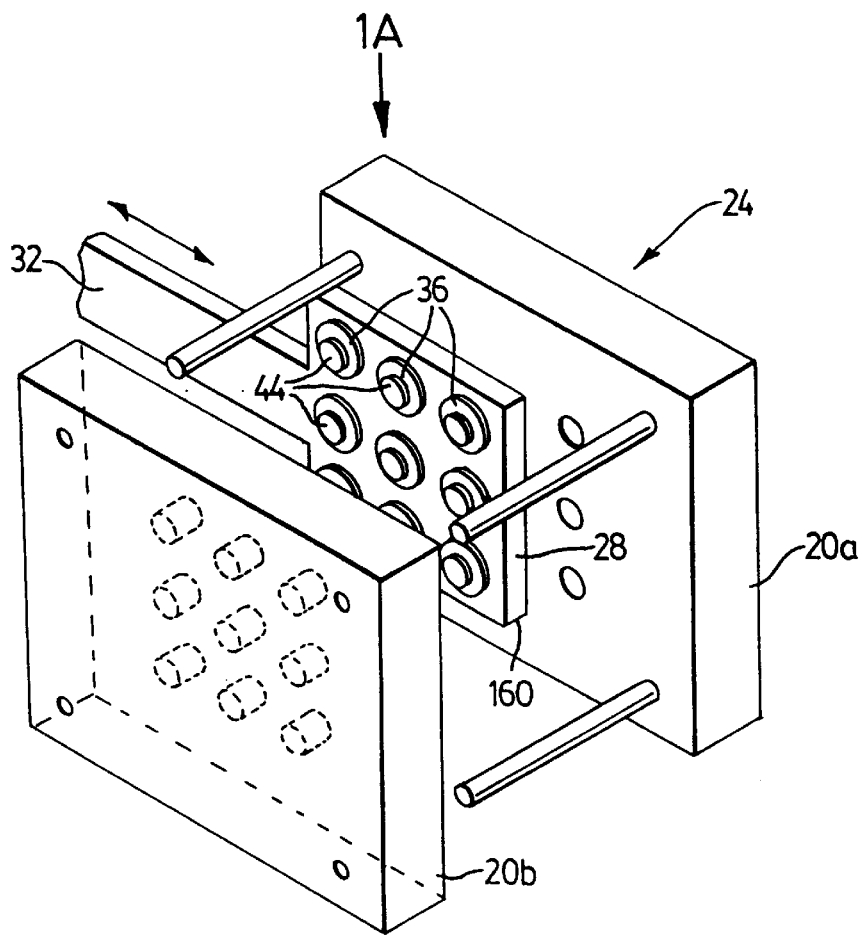
FIG. 1 shows an exploded view of a mold and a removal tool plate in accordance with an embodiment of the present invention.
Figure 1A:
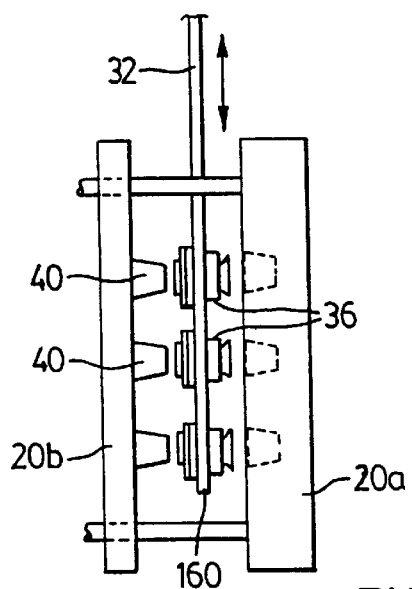
FIG. 1A shows a view in the direction of arrow 1A in FIG. 1 of the mold and removal tool plate of FIG. 1 in position for removing parts.
Figure 2:
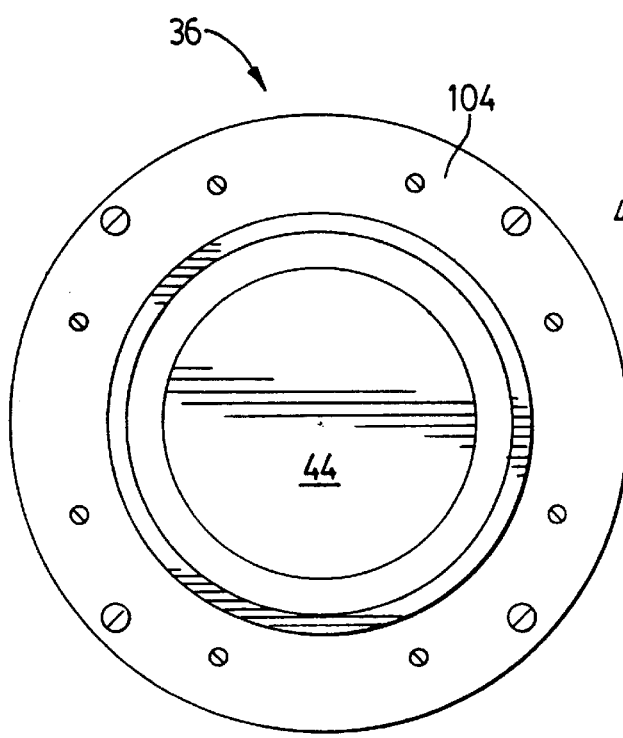
FIG. 2 shows a font view of a retention apparatus in accordance with the present invention with a part being retained therein.

FIGS. 1 and 1A show a mold 20 comprising a pair of mold halves 20a, 20b, and a part removal system 24 for removing parts from mold 20. System 24 includes a removal tool plate 28 connected to an arm 32 which can be connected to any suitable means for moving removal tool plate 28 into and out of mold 20, such as a robot, etc. As shown, removal tool plate 28 includes a plurality of part retention apparatus 36 which are arranged in an array which is complementary to the array of mold cores 40 (best seen in FIG. 1A) on core plate 20b. In these Figures, each part retention apparatus 36 is holding a part 44 which has been removed from the cores.

In these Figures, and in the remainder of the Figures and the discussion below, part 44 is illustrated as a frustoconical thin-walled container, such as those commonly employed to contain margarine or the like. It will be apparent to those of skill in the art that the present invention is not limited to parts 44 with a frustoconical shape, and parts with various exterior geometries, including parallelepiped, etc. can be retained within suitably shaped retention apparatus 36, as will be described further below. As will also be apparent to those of skill in the art, the present invention is also not limited to use with thin-walled parts and can also be employed with other types of parts, as will be further described herein.

While the preferred embodiment of part removal system 24 is shown and described herein as being employed with a plastic injection molding machine, it will be apparent to those of skill in the art that system 24 has applicability in other manufacturing processes, such as paper cup forming and aluminium forming, for example.

Referring now to FIGS. 2 through 9, retention apparatus 36 comprises a support body 100, a seal plate 104 and a differ plate 108. Support body 100 includes a through passage 112 which is defined by an inner surface 116 which is complementary in shape to the outside shape of the part 44 which retention apparatus 36 is intended to retain. Surface 166 includes three channels 120 each of which comprises a converging port 124, which converges from the front of body 100 to the entrance of a diverging port 128 which diverges from the entrance to the back of body 100. At least one nozzle 132 is located in each diverging port 128 and allows pressurized air to be introduced into diverging port 128, as is described in more detail below.

Figure 4:
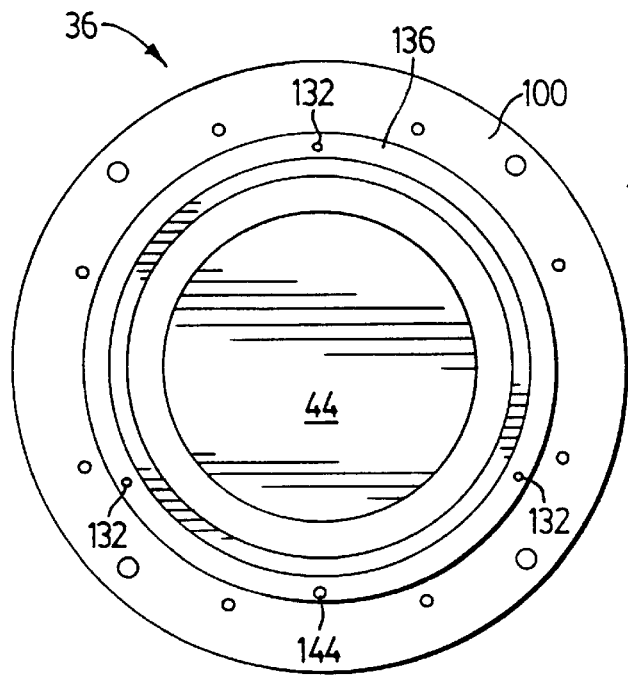
FIG. 4 shows the retention apparatus and part of FIG. 2 with a seal plate removed.
Figure 5:
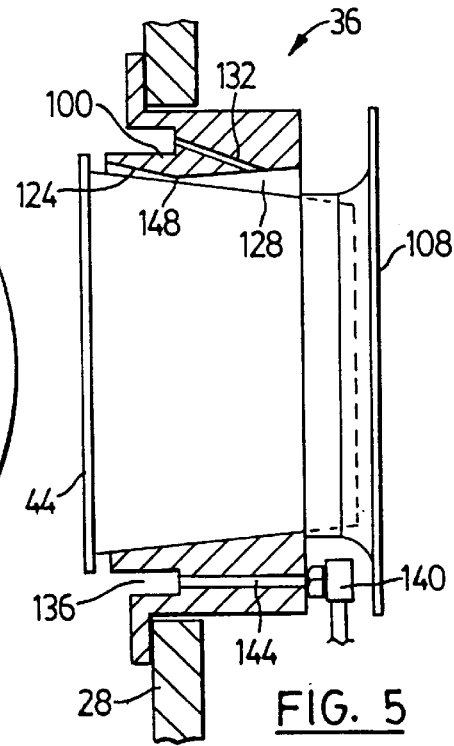
FIG. 5 shows a side section of the retention apparatus of FIG. 4.
Figure 8:
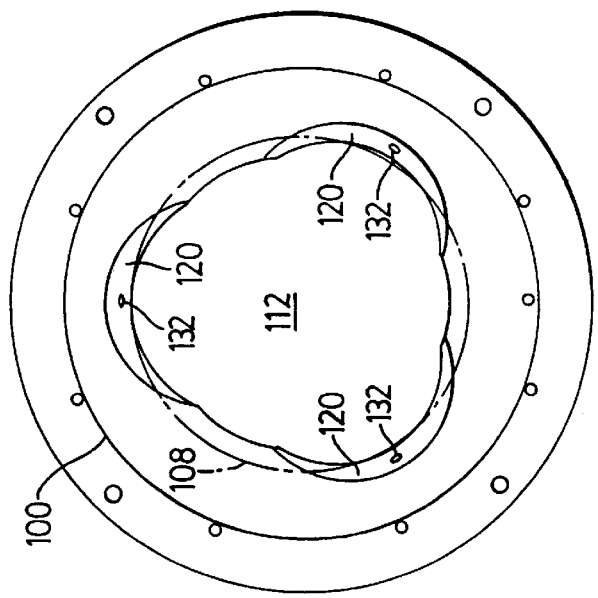
FIG. 8 shows a rear view of the retention apparatus of FIG. 4 without a part retained therein.
Figure 9:
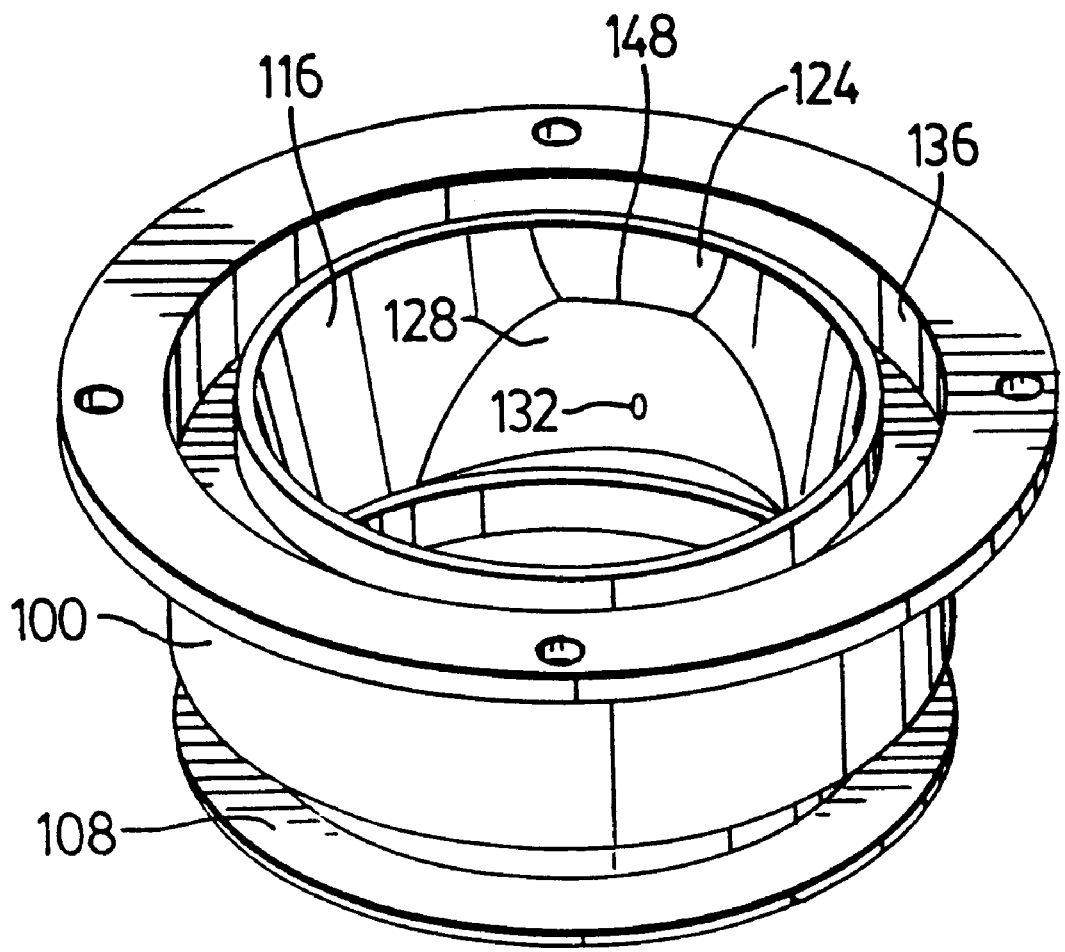
FIG. 9 shows a perspective view of the front and side of the retention apparatus with the seal plate removed.

As best seen in FIGS. 4, 5 and 9, body 100 includes a passage 136 to which each nozzle 132 is connected. Passage 136 acts as a manifold to supply pressurized air to each nozzle 132 and is itself supplied with pressurized air via inlet 140 which is connected to passage 136 by a bore 144. Seal plate 104 is sealingly mounted to body 100, by an o-ring (not shown) or other sealing means to close passage 136 and to inhibit leakage of pressurized air therefrom.

The air supplied at inlet 140 is from a conventional air supply hose (not shown) of small diameter and the air is supplied at a relatively low volume at a suitable pressure. In a present embodiment of the invention, a pressure of eighty psi or more is employed, although it will be apparent to those of skill in the art that a suitable pressure can be higher or lower depending on the part's geometry, size, weight, etc. and dimensions of channel 120. In general, it is contemplated that pressures below about 200 psi will most commonly be employed. The design and operation of jet pumps, such as that described herein, is within the normal skills of those of skill in the art of fluid mechanics and will not be further discussed herein.

Nozzles 132 are appropriately sized such that they produce a high velocity air flow inside diverging port 128, directed toward the back of body 100, and thus act as a jet pump to induce a reduced pressure area, which is adjacent to the connection between converging port 124 and diverging port 128. As a part 44 is ejected from the mold core 20b and begins to enter retention apparatus 36, the wall of part 44 becomes adjacent channel 120, effectively forming a wall to commence closing the open sides of channel 120 and the area of reduced pressure then forms as nozzles 132 and channels 120 begin to function as jet pumps. The areas of reduced pressure draw part 44 into retainer apparatus 36 and nozzles 132 continue to inject air into channels 120, maintaining the area of reduced pressure and thus retaining part 44 within apparatus 36. As will be apparent, the connection 148 between ports 124 and 128 does not contact part 44 and thus air flow through channel 120, and the resulting area of reduced pressure, continues even when part 44 is retained within apparatus 36 and thus part 44 is retained therein until the supply of air to inlet 140 is stopped or part 44 is removed therefrom by other means, such as mechanical grippers or vacuum grippers. Once removed, parts 44 can be stacked by a conventional stacker unit, transported by a conventional conveyor unit, or otherwise handled as desired.

Figure 3:
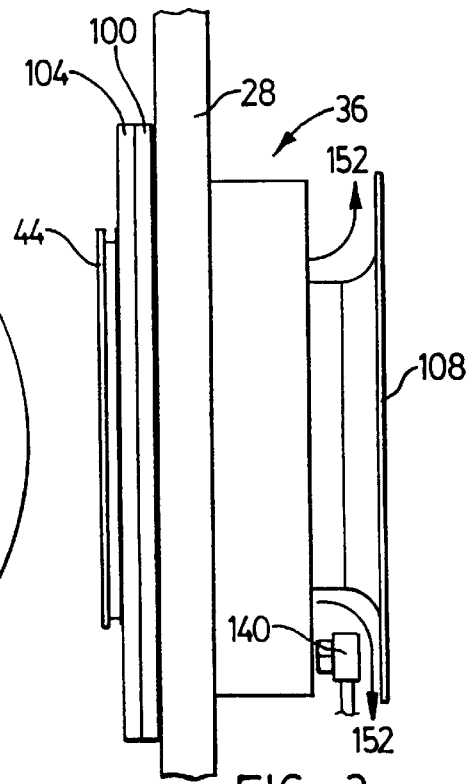
FIG. 3 shows a side view of the retention apparatus of FIG. 2.
Figure 7:
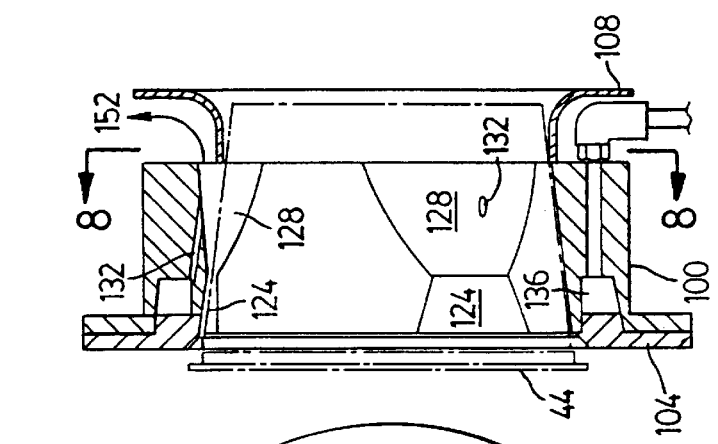
FIG. 7 shows a side section through the retention apparatus of FIG. 2 with a part shown in hosted line.
Figure 6:
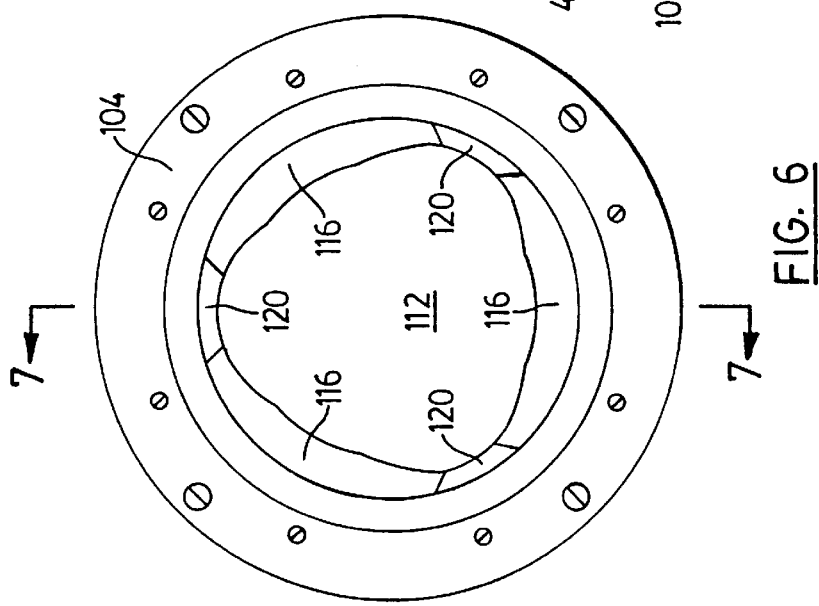
FIG. 6 shows a front view of the retention apparatus of FIG. 2 without a part retained therein.

Diffuser plate 108 is mounted to the back of body 100 and changes the direction of air travelling through channels 120 through about ninety degrees so that the exhaust air exits retention apparatus 36 in a radial manner, as indicated by arrow 152 in FIGS. 1A, 3 and 7. This prevents exhaust air from impinging and contaminating the portion of the mold 20 behind tool plate 28 (mold half 20a in the example of FIGS. 1 and 1A).

As only a relatively low volume of pressurized air is needed to supply nozzles 132, it is contemplated that a single air supply tube (not shown) of small diameter can supply an array of retention apparatus 36. As this tube carries a low volume of air at a moderate pressure, it can also be appropriately selected to be light, flexible and able to withstand the high speeds and fast accelerations and decelerations of the removal tool plate 28 into and out of mold 20. The problems associated with bulky, large diameter vacuum hoses employed with prior art system are thus avoided.

In a present embodiment of the invention, the air supply tube is connected to a lightweight distribution manifold (not shown) on either removal tool plate 28 or arm 32 adjacent removal tool plate 28 and individual air supply tubes extend from to manifold to the inlet 140 of each retention apparatus 36.

As mentioned above, preferably surfaces 116 are complementary to the portion of part 44 which enters apparatus 36 so that this portion fits snugly within apparatus 36. This serves two functions, the first being to continue to support a newly molded part 44 while it cools, thus inhibiting distortion of part 44, and the second being to enhance heat transfer from part 44 to surfaces 116 to provide additional cooling for newly molded part 44. This latter function is further enhanced by the flow of pressurized air through passage 136 to nozzles 132 and the resulting air flow through channels 120 and these air flows remove heat from apparatus 36. Apparatus 36 can be fabricated from a material with suitable heat transfer properties, such as aluminium, but it is preferred that the material be selected primarily to reduce the mass of apparatus 36 while maintaining stiffness, and thus plastic materials are presently preferred. Examples of suitable materials are not unduly limited and include high density polyethylene, or other suitable polymer, preferably plated or coated with metal, such as chromium, to improve wear resistance and prevent unintentional thermal bonding between a warm part 44 and the polymer and/or to promote beat transfer between part 44 and apparatus 36.

As discussed above, the part retention apparatus in accordance with the present invention is not lignite to use with frustoconical parts 44, and parts of cylindrical, parallelepiped and other geometries can be retained by apparatus 36 with suitable shapes. Further, as will be apparent to those of skill in the art, the present invention is not limited to having three channels 120 equi-spaced about the exterior of part 44. It is contemplated, for example, that for large parallelepiped parts two or more channels 120 can be provided to engage at least one pair of opposite sides of the part.

While the illustrated embodiment of the present invention shows an embodiment of apparatus 36 which can only retain a single part, it is contemplated that apparatus 36 can be constructed to retain multiple parts. In such a case, body 100 can be formed with multiple passages 112, each having surfaces 116 and channels 120, with nozzles 132 formed therein, to each receive a different part 44. In such a case, all of nozzles 132 are preferably supplied from a distribution passage formed in body 100 and which is in turn supplied from one or more air inlets 140.

Further, while in the illustrated embodiment all parts 44 have the same shape and size, the present invention is not limited to such configurations. Specifically, it is contemplated that for multicavity molds wherein different parts are manufactured, removal tool plate 28 can include part retention apparatus 36 which correspond to the respective different shapes and/or sizes of the parts. Thus, for example, in a mold wherein the odd rows of cavities form a first type of containers and even rows of cavities form a second type of container, each even numbered row of apparatus 36 on removal tool plate 28 will have a passage 112 which includes a portion complementary in shape to the first type of container and odd numbered rows of apparatus 36 on removal tool plate 28 will have a passage 112 which includes a portion complementary in shape to the second type of container.

Referring again to FIGS. 1 and 1A, an example of the operation of system 20 with an injection molding machine follows. Assuming a start point with mold 20 closed and with removal tool plate 28 filly retracted, molten plastic or other material is injected into the mold cavities by an injection operation. At least the cores 40 in mold 20 are cooled for a predetermined amount of time and mold 20 is then opened. As the parts 44 formed by the injected material shrink to some extent when cooled, parts 44 remain on cores 40 while mold 20 is opened. Preferably, while mold 20 is opening, cooling of parts 44 by cores 40 continues.

As mold half 20b moves away from mold half 20a, arm 32 commences moving removal tool plate 28 into mold 20. Specifically, movement of arm 32 is timed such that mold 20 is opened sufficiently to permit the edge 160 of tool removal plate 28 to enter mold 20 without contacting mold half 20b or cores 40. When arm 32 is fully extended and mold 20 is fully opened, removal tool plate 28 is in the position shown in FIG. 1A with each apparatus 36 immediately adjacent the end of a respective core 40. Parts 44 are then ejected from cores 40, in any suitable conventional manner such as by a stripper plate or by an air blast, toward removal tool plate 28 such that parts 44 commence entry into respective passages 112 of each retainer apparatus 36.

In a present embodiment of the present invention, pressurized air is supplied to the retention apparatus 36 on removal tool plate 28 at all times and parts are removed from retention apparatus 36 by other mechanical or other means outside of mold 20, as the continued air flow provides additional cooling of retention apparatus 36 by the air. Accordingly, as parts 44 enter each retention apparatus 36 air is flowing through channels 120, induced by the air flow from nozzles 132, and the resulting areas of reduced pressure draw part 44 into the retention apparatus 36 and maintain it there. Arm 32 then reacts removal tool plate 28 from mold 20 which can then be closed for the start of another injection cycle. When arm 32 has retracted to a predefined unloading position, push rods, conventional vacuum grippers, air blasts or any other suitable means is employed to remove parts 44 from retention apparatus 36 to a suitable collection area, such as a conventional conveyor or stacker unit and the removal cycle then repeats.

While the present embodiment maintains the flow of air to retention apparatus 36 throughout the cycle, it is contemplated that in some circumstances it may be desired to interrupt the air flow when parts 44 are to be removed from retention apparatus 36.

While it is preferred that arm 32 only be required to move into and out of mold 20, it is contemplated that in some circumstances it may be desired to move removal tool plate 28 toward cores 40 (parallel to the direction of the mold clamp unit) after arm 32 has extended it into mold 20. A variety of mechanisms for accomplishing this movement are within the prior art and will not be further discussed herein. Of course, if removal tool plate 28 is moved parallel to the direction of the mold clamp unit to retain parts 44, it is moved in the opposite direction to clear cores 40 before and 32 retracts it from within mold 20.

It will be understood, of course, that after modifications can be made in the embodiment of the invention illustrated and described herein without departing from the scope and purview of the invention as defined by the appended claims.

We claim:

1. A method of removing a part from a mold comprising the steps of:
   (i) opening a mold containing at least one part to be removed, said part being on a mold core;
   (ii) moving a removal tool plate with at least one part retention apparatus mounted thereon into said mold such that said part retention apparatus is adjacent to and aligned with a respective said mold core;
   (iii) ejecting said part from said mold core such that at least a portion of said part enters said part retention apparatus;
   (iv) supplying pressurized air to said at least one part retention apparatus to induce at least one area of reduced pressure between said part and said apparatus, said area drawing said part into said apparatus and retaining said part therein;
   (v) moving said removal tool plate out of said mold to a part unloading position and closing said mold;
   (vi) removing said at least one part from said apparatus; and
   (vii) repeating steps (i) through (vi) for each injection operation.

2. The method of claim 1 wherein said supply of pressurized air in step (iv) is maintained at least in steps (i), (ii), (iii) and (v) to enhance cooling of each said at least one part retention apparatus.

3. The method of claim 1 wherein step (ii) is commenced prior to completion of step (i).

4. The method of claim 3 wherein said mold contains a plurality of parts to be removed and a corresponding plurality of mold cores.

5. A part retention apparatus comprising:
   a body including at least one passage extending through said body and said passage including an inner surface, at least a portion of which is complementary in shape to a part to be retained; and at least one channel formed in the inner surface of said passage, said channel comprising a converging port extending from a first end of said at least one passage at which said part is received and a diverging port connected to said converging port and extending to a second end of said passage opposite said first end and said at least one channel further comprising at least one nozzle operable to inject air supplied thereto into said diverging port wherein, upon entry of a part into said at least one passage, an area of reduced pressure is formed in said channel about the connection between said converging port and said diverging port by said injected air and said area of reduced pressure acts to draw said part into said passage and to retain said part therein.

6. A part retention apparatus according to claim 5 further comprising a diffuser closing said second end of said at least one passage and operable to redirect air exiting said diverging port of said at least one channel to a substantially lateral direction relative to said passage.

7. A part retention apparatus according to claim 5 further comprising an air inlet to receive a supply of pressurized air and to provide said pressurized air to each said at least one nozzle.

8. A part retention apparatus according to claim 7 wherein air received at said air inlet is distributed to each said at least one nozzle through a passage in said body.

9. A part retention apparatus according to claim 6 comprising at least three channels equi-spaced about said passage and each said channel includes at least one nozzle.

10. A part retention apparatus according to claim 5 wherein said body is formed from lightweight plastic material.

11. A part retention apparatus according to claim 10 wherein at least the portion of said lightweight plastic which contacts said part is plated with a metal.

12. A part retention apparatus according to claim 5 wherein said body is formed from aluminium.

13. A part retention apparatus according to claim 5 including at least two passages, each of said at least two passages including at least one said channel and being operable to retain a respective part.

14. A part removal system for a molding machine comprising:

a removal tool plate;

at least one part retention apparatus mounted to said removal tool plate and comprising a body including at least one passage extending through said body and said passage including an inner surface, at least a portion of which is complementary in shape to a part to be retained and at least one channel formed in the inner surface of said passage, said channel comprising a converging port extending from a first end of said at least one passage at which said part is received and a diverging port connected to said converging port and extending to a second end of said passage opposite said first end and said at least one channel farther comprising at least one nozzle operable to inject air supplied thereto into said diverging port wherein, upon entry of a part into said at least one passage, an area of reduced pressure is formed in said channel about the connection between said converging port and said diverging port by said injected air and said area of reduced pressure acts to draw said part into said passage and to retain said part therein;

means to move said removal tool plate into and out of an open mold; means to supply said pressurized air to said at least one part retention apparatus to draw in and maintain a part therein; and means to remove a part from said retention apparatus when said removal tool plate is out of said mold.

15. A part removal system according to claim 14 including a plurality of said part retention apparatus mounted on said removal tool plate in an array corresponding to cores in said mold.

16. A part removal system according to claim 15 further comprising a distribution manifold and wherein said means to supply pressurized air supplies is operably connected to said manifold and said manifold distributes said pressurized air to each said part retention apparatus.

17. A part removal system according to claim 15 wherein said portion of said passage in each said part retention apparatus has the same shape.

18. A part removal system according to claim 14 wherein said means to move said removal tool plate into and out of an open mold comprises a robotic arm.

* * * * *